United States Patent

Sluijter et al.

[11] Patent Number: 5,878,081
[45] Date of Patent: Mar. 2, 1999

[54] TRANSMISSION SYSTEM FOR QUASI PERIODIC SIGNALS

[75] Inventors: Robert J. Sluijter; Eric Kathmann; Rakesh Taori, all of Eindhoven, Netherlands

[73] Assignee: U.S. Philips Corporation, New York, N.Y.

[21] Appl. No.: 949,648

[22] Filed: Oct. 14, 1997

Related U.S. Application Data

[63] Continuation of Ser. No. 402,256, Mar. 10, 1995, abandoned.

[30] Foreign Application Priority Data

Mar. 11, 1994 [EP] European Pat. Off. .............. 94200637

[51] Int. Cl.⁶ .................................................. H04B 14/04
[52] U.S. Cl. ........................... 375/242; 704/201; 704/207; 704/265
[58] Field of Search ............................. 375/242; 704/201, 704/205, 212, 231, 236, 258, 265, 268, 206, 207

[56] References Cited

U.S. PATENT DOCUMENTS

| | | | |
|---|---|---|---|
| 4,384,335 | 5/1983 | Duifhuis et al. | 364/513 |
| 4,625,327 | 11/1986 | Sluijter et al. | 381/49 |
| 4,907,277 | 3/1990 | Callons et al. | 375/240 |
| 5,321,729 | 6/1994 | Schroder et al. | 375/122 |

*Primary Examiner*—Don N. Vo
*Attorney, Agent, or Firm*—Jack D. Slobod

[57] ABSTRACT

In a transmission system for a quasi-periodic signal, an encoder (12) transmits to a decoder (28) no more than a single period from a total number of periods of the quasi-periodic signal in encoded form. In this decoder (28) the lacking periods of the quasi-periodic signal are reconstructed by means of interpolation. For obtaining an enhanced quality of the reconstructed signal, a signal segment is transmitted that is representative of two successive periods of the quasi-periodic signal. This signal segment may contain two successive periods, but may also be a signal segment having the length of a single period and being determined by a weighted sum of two successive periods.

8 Claims, 8 Drawing Sheets

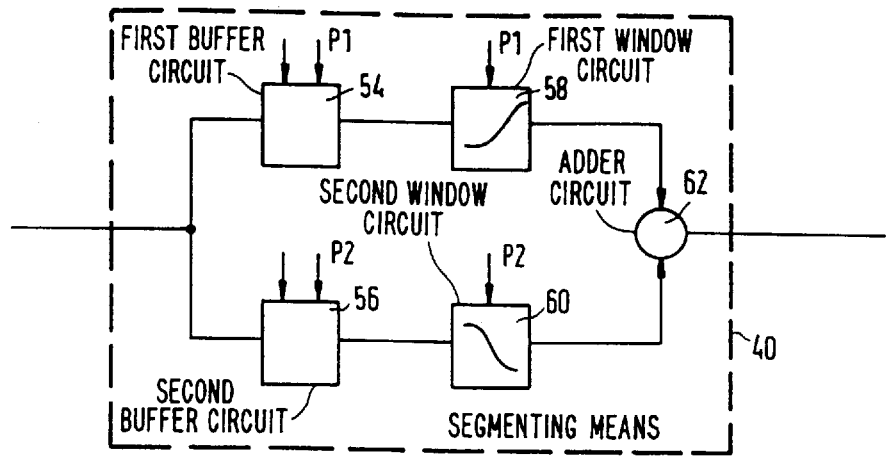
FIG.4
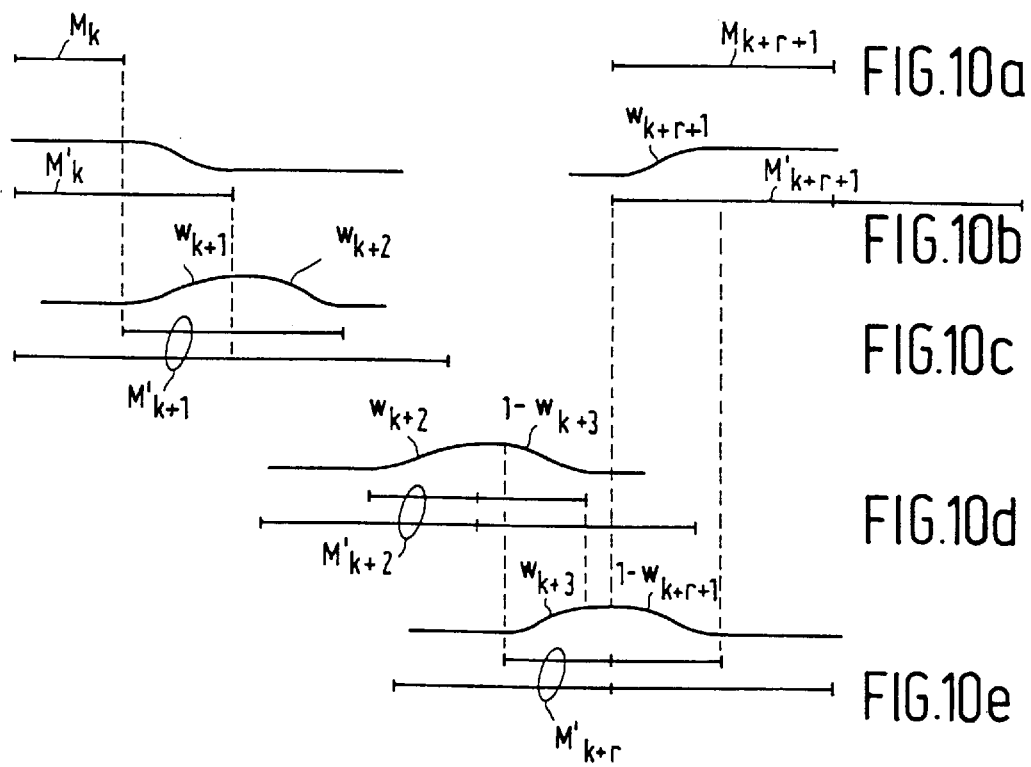
FIG.10a
FIG.10b
FIG.10c
FIG.10d
FIG.10e

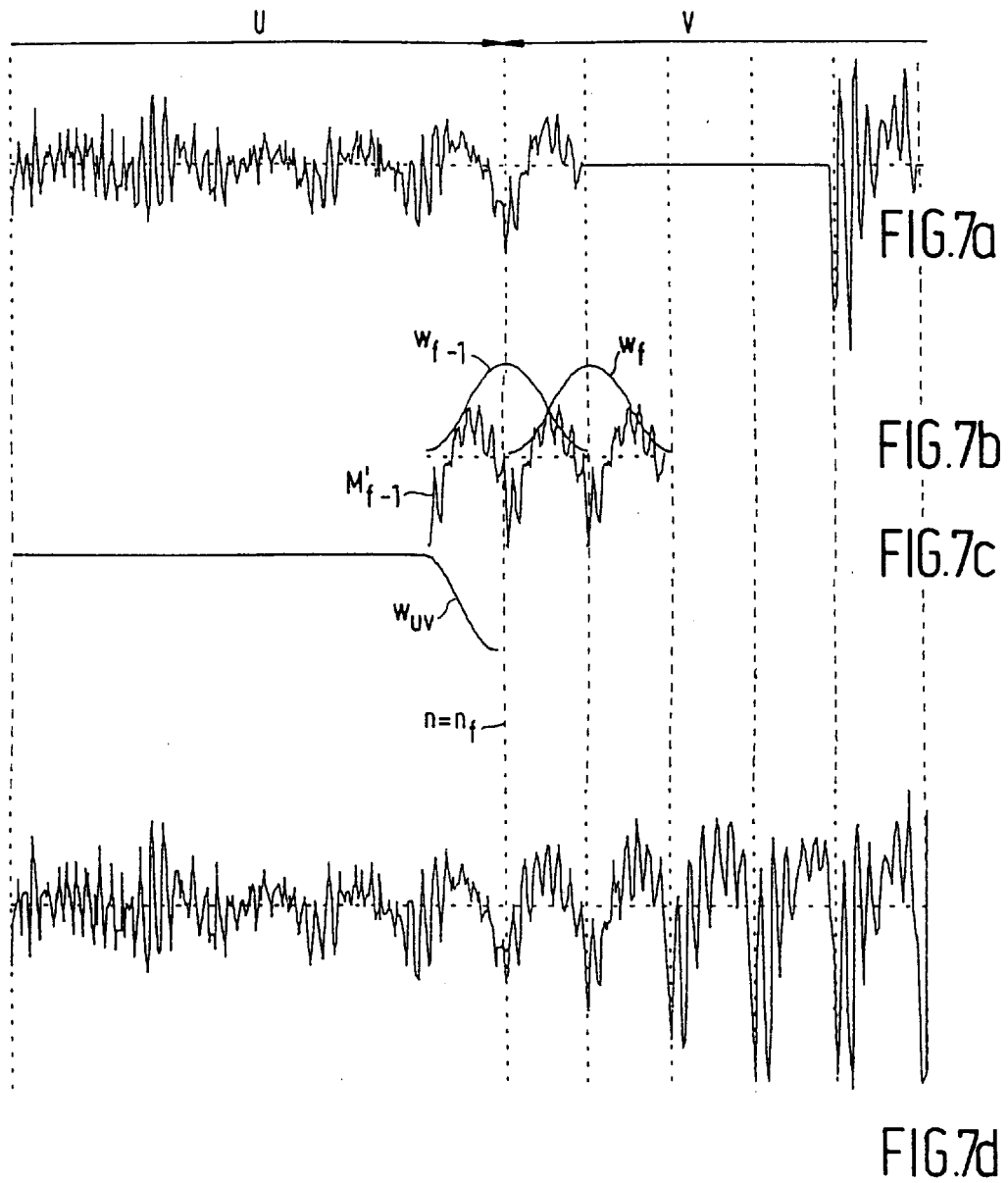

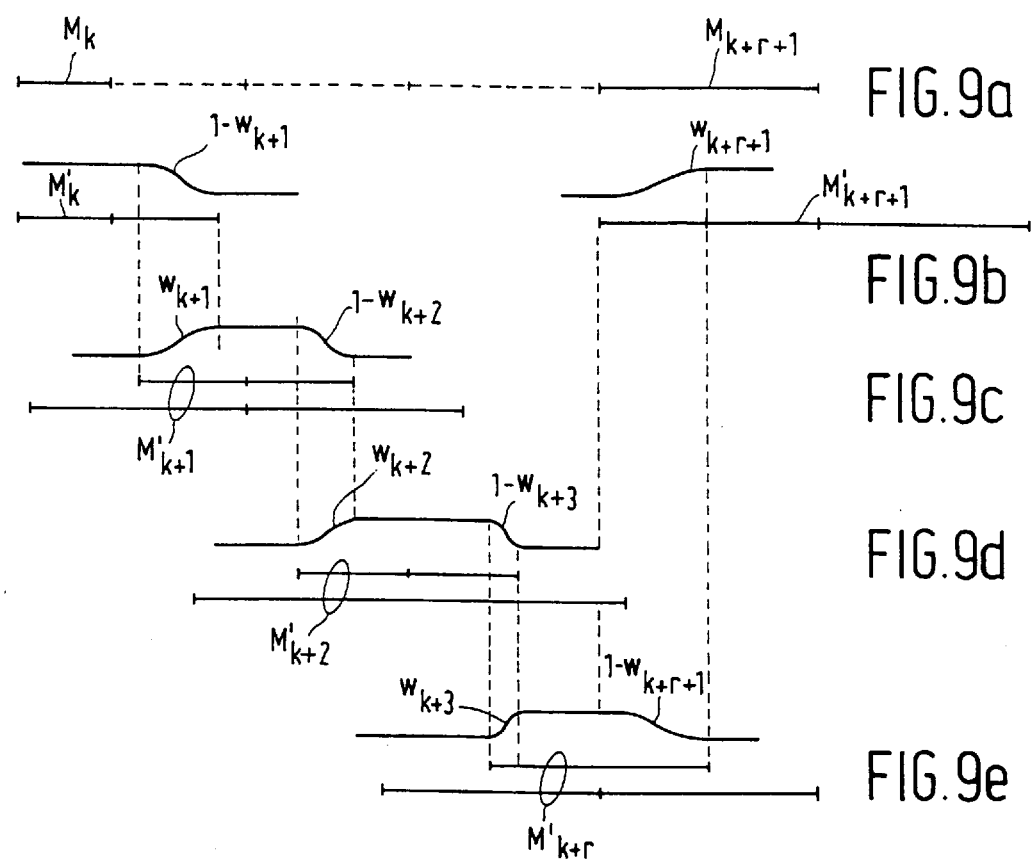

TRANSMISSION SYSTEM FOR QUASI PERIODIC SIGNALS

This is a continuation of application Ser. No. 08/402,256, filed Mar. 10, 1995 now abandoned.

BACKGROUND OF THE INVENTION

The invention relates to a transmission system comprising a transmitter which includes an encoder for deriving an encoded signal from a quasi-periodic signal, transmitting means for transmitting the encoded signal to a receiver, which receiver includes a decoder for deriving a reconstructed signal from the encoded signal.

The invention additionally relates to a transmitter, a receiver, an encoder, a decoder and a codec to be used in such a transmission system. A transmission system as defined in the opening paragraph is known from the journal article "Methods for Waveform Interpolation in Speech Coding" by W. B. Kleijn in Digital Signal Processing, vol. 1, no. 4, October 1991, pages 215–230.

Transmission systems of this type are used, for example, for transferring speech or music signals by channels that have a limited transmission capacity.

A first example of such a channel is a radio channel between a mobile station and a fixed base station. The available transmission capacity of this channel is limited because this channel is used by a great many users.

A second example is a recording channel which utilizes a magnetic, optical or a different recording medium such as, for example, semiconductor storage. Examples of systems utilizing such recording channels are dictating systems and machines utilizing a voice-supported user interface. In such systems it is usually desirable to provide maximum reduction of the necessary storage capacity. Prior-art systems utilize linear prediction or sub-band coding for this purpose.

In the transmission system known from said journal article, no more than a single period from a total number of periods of the quasi-periodic signal is encoded in the encoder. The transmitting means transmit the encoded signal thus obtained to the receiver through the channel. The decoder in the receiver decodes the encoded signal into a reconstructed signal. This is effected by determining the untransmitted periods of the quasi-periodic signal by means of interpolation with the periods of the quasi-periodic signal that have indeed been transmitted. It is noted that the quasi-periodic signal may be a voiced part of a speech signal. Alternatively, however, the quasi-periodic signal may be a residual signal that has been derived from a voiced part of a speech signal with a linear-prediction-based technique.

For determining the signal periods to be transmitted, it is necessary in the transmission system known from said journal article that the quasi-periodic signal be sampled at a rate that is considerably higher than is necessary according to the sampling theorem. For obtaining a reasonable quality of the reconstructed signal, it is necessary to utilize a complex algorithm for the selection of the quasi-periodic signal periods to be transmitted. Said properties of the prior-art transmission system have led to a considerable complexity of the prior-art transmission system.

SUMMARY OF THE INVENTION

It is an object of the invention to provide a transmission system as defined in the opening paragraph, which system has considerably reduced complexity without a loss of quality of the reconstructed signal.

For this purpose, the invention is characterized in that the encoder comprises segmenting means for deriving signal segments which are each representative of two successive periods of the quasi-periodic input signal, in that the encoded signal is representative of an incomplete sequence of signal segments, and in that the decoder is arranged for deriving a reconstructed signal from a combination of window-function-weighted successive signal segments from a sequence of signal segments that has been complemented by interpolation.

The invention is based on the recognition that it is possible to obtain a reconstructed signal from signal segments representing two periods of the quasi-periodic signal by weighting with a window function and combining successive weighted segments, which reconstructed signal perceptibly hardly differs from the input signal. Since the signal segment is representative of two successive periods of the quasi-periodic signal, it is possible to weight this signal segment with a window function without too much information getting lost. Since the signal segments are weighted with a window function, they can be combined to a smoothly running reconstructed signal by means of summation, which reconstructed signal perceptibly hardly differs from the quasi-periodic transmit signal. This smoothness renders the selection of the signal segments considerably less critical than the selection of these signal segments in the state-of-the-art transmission system. As a result, the election of the signal segments may be performed in a simpler manner. Moreover, it is no longer necessary to sample the quasi-periodic signal at a sampling rate that is higher than the rate required by the sampling theorem.

An embodiment of the invention is characterized in that the segmenting means comprise window means for determining reduced signal segments from a sum formed by a first period of the quasi-periodic signal weighted with a first coding window function and a second period of the quasi-periodic signal weighted with a second coding window function, and in that the signal segments comprise reduced signal segments.

Experiments have shown that it is possible to replace a signal segment comprising two successive periods of the quasi-periodic signal by a one-time repetition of a reduced signal segment, without a loss of perceptible quality occurring. This is advantageous in that no more than this signal segment having the length of a single period of the quasi-periodic signal needs to be transmitted. This leads to a reduction by half of the transmission capacity needed by the transmission system.

For first and second coding window functions that have turned out to be suitable it appears to hold that the initial value of the first coding window function and the final value of the second coding window function are equal to zero and that the final value of the first coding window function is equal to the initial value of the second coding window function.

This choice of coding window functions may lead to a signal segment that can be periodically continued without this leading to a perceptible loss of quality.

BRIEF DESCRIPTION OF THE DRAWING

The invention will be further explained with reference to the drawing Figures in which like elements are referenced by like reference characters, in which:

FIG. 4 shows an embodiment for segmenting means 40 according to the invention to be used in an encoder shown in FIG. 2;

FIGS. 7a–7d shows graphs of the signal forms as they may occur in the decoder 28 at the transition from an unvoiced speech signal to a voiced speech signal;

FIGS. 9a–9e show graphs of the reconstruction window functions as they may occur in an alternative embodiment; and FIGS. 10a –10e show graphs of the reconstruction window functions as these functions may occur in non-overlapping shortest periods of successive signal segments.

DESCRIPTION OF THE PREFERRED EMBODIMENTS

Figure 1:
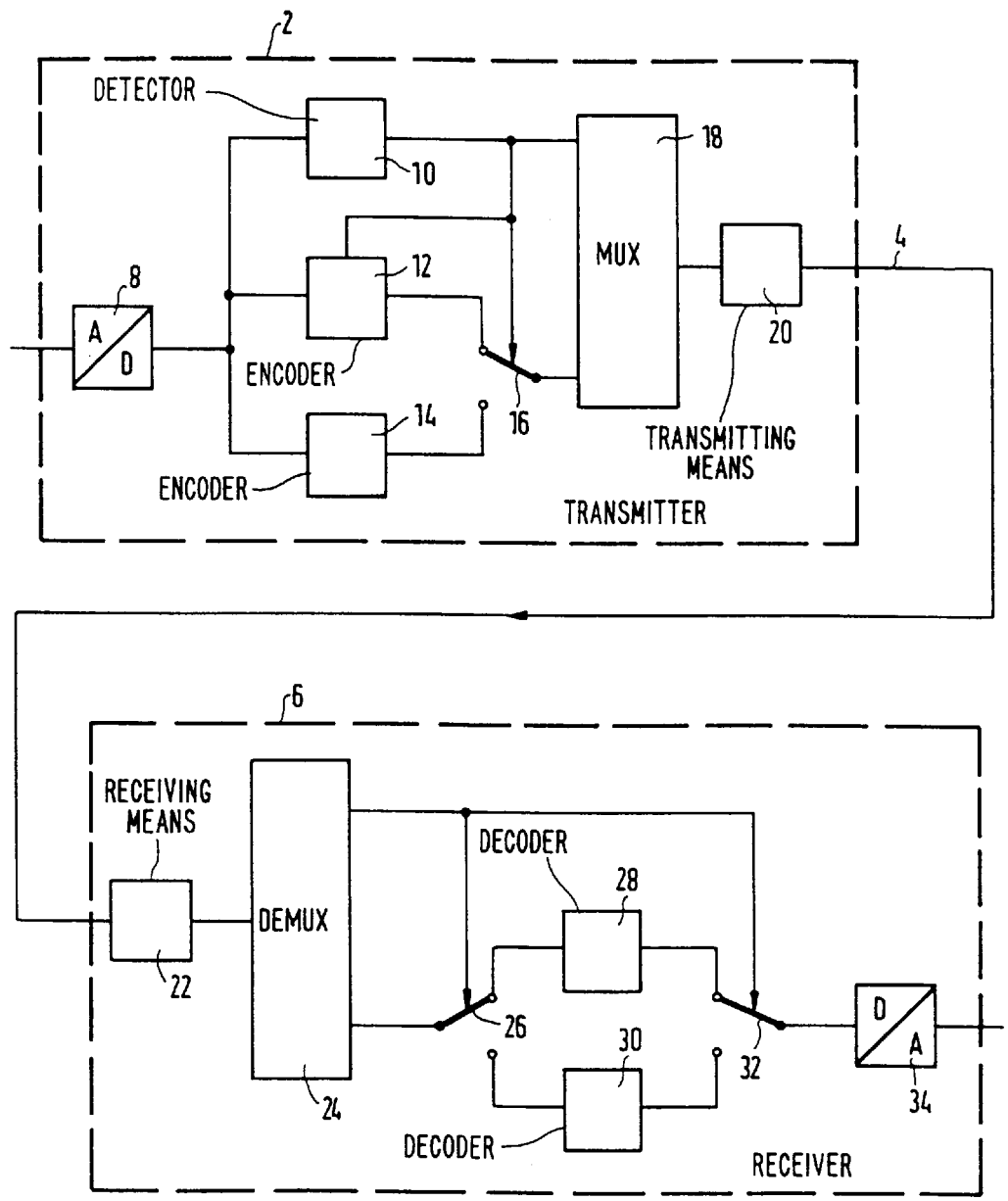
FIG. 1 shows a transmission system in which the invention can be implemented.

In the transmission system shown in FIG. 1, a quasi-periodic signal, in this case a speech signal, is applied to a transmitter 2. In this transmitter 2 the speech signal is applied to an analog-to-digital converter 8. The output of the analog-to-digital converter 8 is connected to an input of a detector 10, to an input of an encoder 12 for quasi-periodic signals, and to an input of a further encoder 14 for non-periodic signals. An output of the detector 10 is connected to an input of a multiplexer 18, to a control input of the encoder 12 and to a control input of a two-way switch 16. The output of the encoder 12, carrying the encoded signal for its output signal, is connected to a first make-and-break contact of the two-way switch 16, whilst the output of the encoder 14 is connected to a second make-and-break contact of the two-way switch 16. The central contact of the two-way switch 16 is connected to a second input of the multiplexer 18. The output of the multiplexer 18 is connected to the input of the transmitting means 20. The output of the transmitting means 20 also forms the output of the transmitter 2 and is connected to an input of the channel 4.

The output of the channel 4 is connected to the input of receiving means 22 in a receiver 6. The output of the receiving means 22, carrying the encoded signal for its output signal, is connected to the input of a demultiplexer 24. A first output of the demultiplexer 24 is connected to the control input of a two-way switch 26 and to the control input of a two-way switch 32. A second output of the demultiplexer 24 is connected to the central contact of the two-way switch 26. A first make-and-break contact of the two-way switch 26 is connected to a decoder 28 for deriving the reconstructed signal from the encoded signal. A second make-and-break contact of the two-way switch 26 is connected to a further decoder 30. The output of the decoder 28, carrying the reconstructed signal for its output signal, is connected to the first make-and-break contact of the two-way switch 32, while the output of the further decoder 30 is connected to a second make-and-break contact of the two-way switch 32. The central contact of the two-way switch 32 is connected to the input of a digital-to-analog converter 34. The output of the digital-to-analog converter 34 forms the output of the receiver 6.

In the transmission system shown in FIG. 1 the speech signal to be transmitted (or to be recorded) is converted by the analog-to-digital converter 8 into a digital signal that has an 8 kHz sampling frequency. The detector 10 detects whether the output signal of the analog-to-digital converter 8 is quasi-periodic (voiced) or non-periodic (unvoiced). The output signal of this detector 10 has a first logical value for a quasi-periodic signal and has a second logical value for a non-periodic signal. Embodiments for the detector 10 are described, for example, in U.S. Pat. No. 4,625,327 and 4,384,335.

The encoder 12 is arranged for encoding quasi-periodic signals, whereas the encoder 14 is arranged for encoding non-periodic signals. The encoder 12 is arranged according to the inventive idea and will be further explained later on. A suitable embodiment for the encoder 14 is described, for example, in the published PCT Patent Application WO 92/06470.

When a quasi-periodic input signal is present, the encoded output signal of the encoder 12 is applied to the multiplexer 18 via the two-way switch, which switch is also instrumental in applying the output signal of the encoder 14 to the multiplexer 18 if a non-periodic signal is present. Also the output signal of the detector 10 is applied to the multiplexer 18. In this manner there is achieved that the quasi-periodic and non-periodic parts of the speech signal are encoded by the encoder that is the most suitable for the particular parts of the speech signal. The output signal of the multiplexer 18 is fed to the channel 4 by the transmitting means 20. These transmitting means may comprise, for example, a modulator.

The output signal of the channel 4 is fed to receiving means 22 in the receiver 6. These receiving means convert the output signal of the channel into a signal suitable to feed to the demultiplexer 24. These receiving means 22 may comprise, for example, a demodulator and a detector. The two-way switches 26 and 32 are moved to the appropriate state by the output signal on the first output of the demultiplexer 24 which signal indicates whether the encoded signal represents a quasi-periodic signal or a non-periodic signal. If the encoded signal represents a quasi-periodic signal, the second output of the demultiplexer 24 is connected to the decoder 28, and the output of the decoder 28 is connected to the input of the digital-to-analog converter 34. If the encoded signal represents a non-periodic signal, the second output of the demultiplexer 24 is connected to the further decoder 30, and the output of the further decoder 30 is connected to the input of the digital-to-analog converter 34. In this manner always the appropriate decoder is used for determining the reconstructed signal. The digital-to-analog converter 34 then produces the reconstructed signal in analog form on the output of the receiver.

As observed before, it is possible for the quasi-periodic signal to comprise a residual signal which is derived from a speech signal by a prediction filter whose coefficients are determined by linear prediction. In such a situation a prediction filter is to be included directly after the analog-to-digital converter 8, and prediction means are to be added which determine the prediction parameters from the output signal of the analog-to-digital converter 8. These prediction parameters are then to be fed to the multiplexer 18 in digitized form so as to be transmitted to the receiver 6. In the receiver 6 an inverse filter is to be included between the central contact of the two-way switch 32 and the input of the digital-to-analog converter 34. This inverse filter then has a transfer function that is inverse to the prediction filter transfer function. For this purpose the inverse filter is set in response to the prediction coefficients available on an additional output of the demultiplexer 24.

Figure 2:
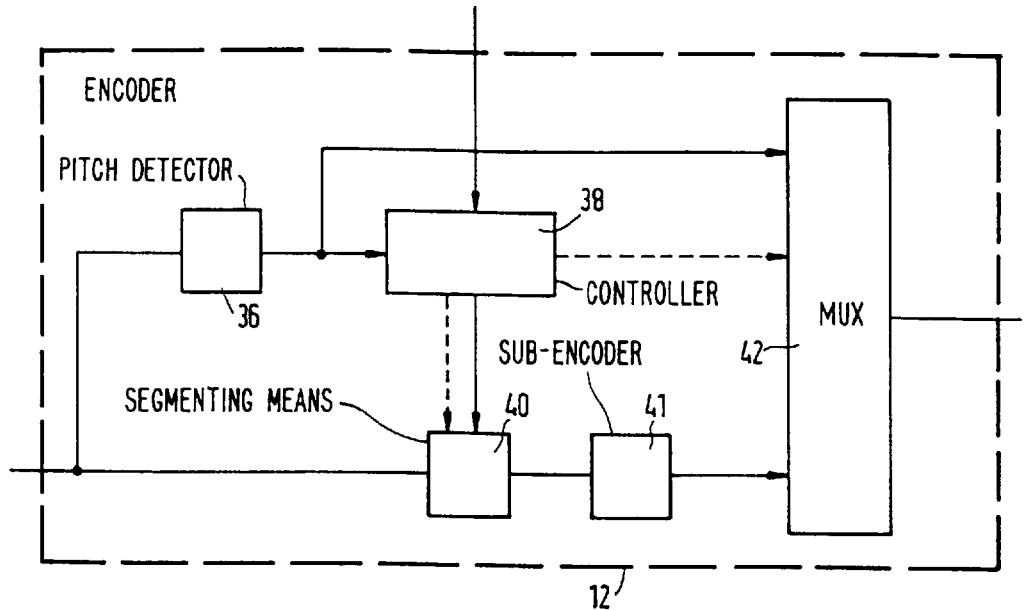
FIG. 2 shows an encoder 12 according to the invention to be used in a transmission system shown in FIG. 1.

In the encoder 12 shown in FIG. 2 the sampled quasi-periodic input signal s[n] is applied to the input of a pitch detector 36 and to the input of the segmenting means 40, while n is a running variable denoting the serial number of a particular sample. The output of the pitch detector 36, carrying an output signal that represents the serial number $n_k$ of the first signal sample of successive periods k of the quasi-periodic signal, is connected to a first input of controller 38. The output of the pitch detector 36 is further connected to a first input of a multiplexer 42. A second input of the controller 38 is connected to the output of the detector 10 in FIG. 1. A first output of the controller 38 is connected to a control input of the segmenting means 40.

A second output of the controller 38, carrying for its output signal a signal that indicates the number of untransmitted signal segments between two transmitted signal segments, is connected to a second input of the multiplexer 42. The output of the segmenting means 40 is connected to the input of a sub-encoder 41. The output of the sub-encoder 41, carrying the encoded signal for its output signal, is connected to a third input of the multiplexer 42. The encoded quasi-periodic signal is available on the output of the multiplexer 42.

In the encoder shown in FIG. 2, the pitch detector 36 determines the beginning $n_k$ of each period of the quasi-periodic signal s[n]. An embodiment for the pitch detector 36 is described, for example, in the journal article "Automatic and Reliable Estimation of Glottal Closure Instant and Period" by Y. M. Cheng and D. O'Shaughnessy in IEEE Transactions on Acoustics, Speech and Signal Processing, vol. 37, no. 12, December 1989, pages 1805–1815. From the beginning of each of the periods, the period duration $p_k$ of each of the periods k may be determined from:

$$p_k = n_{k+1} - n_k.$$

The controller 38 counts the number of periods of the quasi-periodic signal and applies a control signal to the segmenting means for two successive periods from a larger number of periods (for example, four). In a first embodiment the segmenting means 40 take a signal segment two periods in length from the quasi-periodic signal and pass this signal segment on to the sub-encoder 41. It is noted that the duration of the successive periods of the quasi-periodic signal need not be the same. In a second embodiment the segmenting means also take a signal segment lasting two periods from the quasi-periodic signal, but convert this two-period signal segment into a reduced signal segment $M_k[n]$. The reduced signal segment is determined by adding together the first segment period weighted with a first window function and the second segment period weighted with the second window function. The following then holds for $M_k[n]$:

$$M_k[n] = s[n]w_\alpha[n] + s[n+p_k]w_\beta[n+p_k] \quad (1)$$

In (1) $w_\alpha[n]$ and $w_\beta[n]$ are window functions chosen such that $M_k[n]$ has the following properties:

$M_k[n]$ has a period duration equal to $P_k$, and $M_k[n]$ is equal to zero for values of n smaller than $n_k$ and for values of n larger than or equal to $n_k + p_k$.

the periodic continuation $C_k[n+mp_k]$ (m is an integer) of $M_k[n]$ does not contain undesired discontinuities. This is achieved by making $M_k[n_k]$ equal to $s[n_{k+1}]$ and by making $M_k[n_{k+1} - 1]$ equal to $s[n_{k+1} - 1]$. This means that the last sample from $M_k[n]$ and the first sample from $M_k[n]$ are two successive samples from the original quasi-periodic signal. Moreover, the window functions $w_\alpha$ and $w_\beta$ are to have a gradual pattern, so that they themselves cannot introduce undesired discontinuities.

Suitable window functions $w_\alpha$ and $w_\beta$ are complementary, so that $w_\alpha[n] + w_\beta[n+p_k]$ equals 1 for $n_k \leq n < n_k + p_k$. Suitable window functions $w_\alpha$ and $w_\beta$ are, for example:

$$w_\alpha[n] = \begin{cases} 0 & ; n < n_k \\ 0.5 - 0.5\cos\left(\pi \frac{n - n_k}{p_{min} - 1}\right) & ; n_k \leq n < n_k + p_{min} \\ 1 & ; n_k + p_{min} \leq n < n_k + p_k \\ 0 & ; n_k + p_k \leq n \end{cases} \quad (2)$$

$$w_\beta[n] = \begin{cases} 0 & ; n < n_{k+1} \\ 0.5 + 0.5\cos\left(\pi \frac{n - n_{k+1}}{p_{min} - 1}\right) & ; n_{k+1} \leq n < n_{k+1} + p_{min} \\ 0 & ; n_{k+1} + p_{min} \leq n \end{cases} \quad (3)$$

In (2) and (3) $P_{min}$ is the minimum value of $p_k$ and $P_{k+1}$. Since the reduced signal segment thus obtained is only half the length of the original signal segment, the transmission capacity needed for transmitting the signal segment is reduced by a factor of two.

Transitions from a quasi-periodic signal to a non-periodic signal are also detected by the pitch detector. With such a transition the reduced signal segment is derived from the last period of the quasi-periodic signal. If the non-periodic signal starts at $n=n_u$, the last period of the quasi-periodic signal comprises the signal samples $s[n_{u-1}], s[n_{u-1}+1], \ldots, s[n_{u-1}]$. The reduced signal segment is now determined from this last period and from a part of the non-periodic signal that has a duration equal to the period $p_{u-1}$ of the last signal segment of the quasi-periodic signal. For determining the window function according to (2) and (3) there is selected:

$$p_k = p_{k+1} = p_{min} = p_{u-1}.$$

An estimate of the two-period-long original signal segment may then be obtained in the decoder by repeating the received reduced signal segment one time. Experiments have shown that there is no audible difference between the original signal segment and a one-time-repeated reduced signal segment.

The sub-encoder 41 may be arranged as a DPCM (Differential Pulse Code Modulation) encoder. Differential Pulse Code Modulation is known, for example, from the title "Digital Coding of Waveforms" by N. S. Jayant and P. Noll, 1984, ISBN 0-13-211913-7, Chapter 6, pages 252–272. In the multiplexer 42 the information concerning the duration of the pitch periods is combined with the encoded segments to a combined encoded signal. If the number of untransmitted segments situated between two transmitted segments is variable, this number is also encoded and fed to the multiplexer 42.

Figure 3:
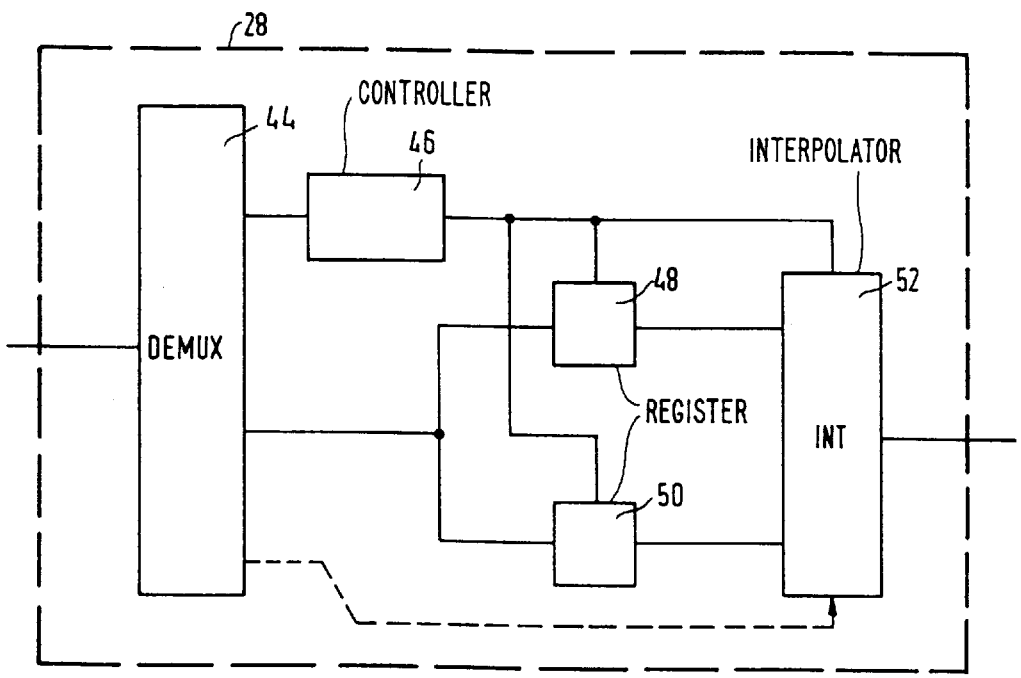
FIG. 3 shows a decoder 28 according to the invention to be used in a transmission system shown FIG. 1.

In the decoder 28 the encoded signal is applied to a demultiplexer 44 as shown in FIG. 3. A first output of the demultiplexer 44 is connected to an input of a controller 46. An output of the controller 46 is connected to a control input of a register 48, to a control input of the register 50 and to a first control input of an interpolator 52. A second output of the demultiplexer is connected to an input of the register 48 and to an input of the register 50. An output of the register 48 is connected to a first signal input of the interpolator 52. The output of the register 50 is connected to a second signal input of the interpolator 52. A third output of the demultiplexer 44, carrying for its output signal encoded information about the number of lacking segments between two encoded segments, is connected to a second control input of the interpolator 52. The output of the interpolator 52 then produces the reconstructed quasi-periodic signal.

The demultiplexer 44 divides the encoded signal into the pitch signal and the number of untransmitted signal segments situated between two signal segments that have been transmitted indeed. Two successive encoded signal segments are stored in the registers 48 and 50. This is effected in response to the control information about the segment length derived from the pitch signal. The interpolator 52 is instrumental in reconstructing the complete sequence of signal segments by interpolation of the signal segments stored in the registers 48 and 50.

It is assumed that a number of reduced signal segments r are lacking between two transmitted reduced signal segments. In order to reconstruct the quasi-periodic signal, the reduced signal segment $M_k[n]$ is periodically extended to a signal segment $M'_k[n]$, $2p_k$ in length, and the second reduced signal segment $M'_{k+r+1}[n]$ is periodically extended to a signal segment $2p_{k+r+1}$ in length. For the first signal segment $M'_k[n]$ and the second signal segment $M'_{k+r+1}[n]$ there may then be written:

$$M'_k[n] = \begin{cases} 0 & ; n < n_k \\ M_k[n] & ; n_k \leq n < n_k + p_k \\ M_k[n - p_k] & ; n_k + p_k \leq n < n_k + 2p_k \\ 0 & ; n_k + 2p_k \leq n \end{cases} \quad (4)$$

$$M'_{k+r+1}[n] = \begin{cases} 0 & ; n < n_{k+r+1} \\ M_{k+r+1}[n] & ; n_{k+r+1} \leq n < n_{k+r+1} + p_{k+r+1} \\ M_{k+r+1}[n - p_{k+r+1}] & ; n_{k+r+1} + p_{k+r+1} \leq n < n_{k+r+1} + 2p_{k+r+1} \\ 0 & ; n_{k+r+1} + 2p_{k+r+1} \leq n \end{cases} \quad (5)$$

If a signal segment, two pitch periods in length, is transmitted, it is obviously no longer necessary to extend this signal segment according to (4) and (5). Then r interpolated signal segments are formed by interpolation of the two known signal segments. For the $i^{th}$ signal segment ($k < i < k+r+1$) the following holds:

$$M'_i[n] = \frac{k+r+1-i}{r+1} M'_k[n + p_k - d_i] + \frac{i-k}{r+1} M'_{k+r+1}[n + d_{k+r+1} - d_i] \quad (6)$$

In (6) $d_i$ equals:

$$d_i = \sum_{m=k}^{i} p_m \quad (7)$$

It is noted that not only linear interpolation, but also higher-order interpolation may be used, but in excess of two reduced signal segments are necessary in that case.

The reconstructed signal is obtained by weighting each of the interpolated signal segments (overlapping by approximately one pitch period) with a window function and adding together the weighted signal segments. The window function has a maximum value in the middle of the particular segment and decreases to a value of zero towards either end of the segment.

The reconstructed signal is then equal to:

$$\hat{s}[n] = \sum_k M'_k[n] w_k[n] \quad (8)$$

A suitable window function $w_k$ is, for example:

$$w_k[n] = \begin{cases} 0 & ; n < n_k \\ 0.5 - 0.5\cos\left(\pi \frac{n - n_k}{p_k}\right) & ; n_k \leq n < n_{k+1} \\ 0.5 + 0.5\cos\left(\pi \frac{n - n_{k+1}}{p_{k+1}}\right) & ; n_{k+1} \leq n < n_{k+2} \\ 0 & ; n_{k+2} \leq n \end{cases} \quad (9)$$

The reconstructed signal is then available on the output of the interpolator 52. Special measures are necessary at the transitions from a non-periodic part to a quasi-periodic part of the signal and vice versa, so as to avoid discontinuities. At a transition from a non-periodic part to a quasi-periodic part of the signal, for $n=n_f$, the quasi-periodic part is extended by signal samples of the reduced signal segment $M_{f-1}[n]=M_f[n+p_f]$, for $n_f-p_f \leq n < n_f$. The signal samples of the reduced signal segment $M_{f-1}[n]$ are multiplied by sample values of a forward-tapering window which window is equal to:

$$w_{f-1}[n] = \begin{cases} 0 & ; n < n_f - p_f \\ 0.5 - 0.5\cos\left(\pi \frac{n - n_f + p_f}{p_f}\right) & ; n_f - p_f \leq n < n_f \end{cases} \quad (10)$$

The non-periodic part of the signal is multiplied by samples of a backward-tapering window which is equal to:

$$w_{io}[n] = \begin{cases} 1 & ; n < n_f - p_f \\ 0.5 + 0.5\cos\left(\pi \frac{n - n_f + p_f}{p_f}\right) & ; n_f - p_f \leq n < n \\ 0 & ; n_f \leq n \end{cases} \quad (11)$$

In addition, in the first period of the periodic signal, which period begins at $n=n_f$, the window function $w_f$ is selected to be equal to 1 for $n_f \leq n < n_{f+1}$. For other parts of the quasi-periodic signal, the window functions are produced by (9). If the most recently transmitted reduced signal segment starts at $n=n_1$, and the non-periodic part of the signal starts at $n=n_u$, where $n_1$ is equal to $n_{u-1}$, there are no lacking periods at the end of the quasi-periodic part of the signal. This means that there is no interpolation problem then. However, if $n_1 < n_{u-1}$, the signal $M'_{k+r+1}$ necessary for interpolation is absent. For $M'_{k+r+1}$ is then taken the first piece from the non-periodic part of the signal which piece is $P_{u-1}$ in length. The last window function $w_k[n]$ is then formed according to (9) in that k is chosen equal to a u−1, and in that k+2 is replaced by $n_u + p_{u-1}$ in (9). As a result, the reconstructed quasi-periodic signal has a backward-tapering window which overlaps the beginning of the non-periodic part of the reconstructed signal by an interval $P_{u-1}$. A smooth transition to the non-periodic part of the reconstructed signal is obtained in that the first piece of the non-periodic part of the signal is multiplied by a forward-tapering window which is equal to:

$$w_{vu}[n] = \begin{cases} 0 & ; n < n_u \\ 0.5 - 0.5\cos\left(\pi \frac{n - n_u}{p_{u-1}}\right) & ; n_u \leq n < n_u + p_{u-1} \\ 1 & ; n_u + p_{u-1} \leq n \end{cases} \quad (12)$$

By adding up the quasi-periodic and non-periodic signal parts formed in above manner, smooth transitions are obtained without undesired discontinuities.

When the window functions according to (9) are used, it is possible that under specific circumstances undesired discontinuities still occur. These discontinuities are developed in the segments M'[n] interpolated according to (6) at the transitions where the shorter signal segment of the segments $M'_k[n+p_k-d_i]$ and $M'_{k+r+1}[n+d_{k+r+1}-d_i]$ becomes equal to zero. If $p_k$ and $p_{k+r+1}$ show little difference in time, these undesired discontinuities are suppressed by the backward-tapering reconstruction windows according to (9). If, however, $p_k$ and $p_{k+r+1}$ present a considerable difference of time, these undesired discontinuities are no longer sufficiently suppressed. In such situations the reconstructed signal in the periods i for which holds $k<i\leq k+r+1$ had better be determined as follows:

$$\hat{s}[n]=M'_i[n]w_i[n]+M'_{i-1}[n](1-w_i[n]); n_i \leq n < n_{i+1} \quad (13)$$

where $$w'_i[n] = \begin{cases} 0 & ; n_i \leq n < n_b \\ 0.5 - 0.5\cos\left(\pi \frac{n - n_b}{n_e - n_b}\right) & ; n_b \leq n < n_e \\ 1 & ; n_e \leq n < n_{i+1} \end{cases} \quad (14)$$

In (14) $n_b$ and $n_e$ are equal to:

$$n_b = \begin{cases} \max\{n_i, n_{i+1} - p_m - 1\} & ; k < i < k + r + 1 \\ n_{k+r+1} & ; i = k + r + 1 \end{cases} \quad (15)$$

with $P_m = \min\{p_k, p_{k+r+1}\}$.

$$n_e = \begin{cases} \min\{n_{i+1}, n_i + p_{i-1}\} & ; i = k + 1 \\ \min\{n_{i+1}, n_i + p_m\} & ; k + 1 < i \leq k + r + 1 \end{cases} \quad (16)$$

These window functions describe a gradual transition which occurs only for the interval in which the successive shortest segments $M'_i[n]$ are overlapping. If these shortest segments are not overlapping ($n_e \leq n_b+1$), the window function according to (14) no longer shows a gradual pattern. For this situation the reconstructed signal is determined according to:

$$\hat{s}[n]=M'_i[n]w'_i[n]+M'_{i-1}w''_i[n], n_i \leq n < n_{i+1} \quad (17)$$

with:

$$w'_i[n] = \begin{cases} 0 & ; n_i \leq n < n_b \\ 0.5 - 0.5\cos\left(\pi \frac{n - n_b}{n_{i+1} - n_b}\right) & ; n_b \leq n < n_{i+1} \end{cases} \quad (18)$$

$$w''_i[n] = \begin{cases} 0.5 + 0.5\cos\left(\pi \frac{n - n_i}{n_e - n_i}\right) & ; n_i \leq n < n_e \\ 0 & ; n_e \leq n < n_{i+1} \end{cases} \quad (19)$$

When these window functions are used, the reconstructed signal becomes equal to zero for values of n in which no shortest signal segment is situated.

At a transition between a non-periodic part of the input signal and a quasi-periodic part, the forward and backward-tapering window functions according to (10) and (11) can be used.

If, at a transition from a quasi-periodic part to a non-periodic part, a reduced signal segment is available for the last period of the quasi-periodic part of the signal, the quasi-periodic signal part stretching out as far as the non-periodic part of the signal is multiplied by a backward-tapering window function:

$$w_u[n] = \begin{cases} 0.5 + 0.5\cos\left(\pi \frac{n - n_u}{p_{u-1}}\right) & ; n_u \leq n < n_u + p_{u-1} \\ 0 & ; n_u + p_{u-1} \leq n \end{cases} \quad (20)$$

The non-periodic part of the signal is then multiplied by a window function that is complementary to that of (20).

If no reduced signal segment is available, the reconstruction of the signal is carried out according to (9) and (12).

It is noted that, in addition to transmitting the value of the periods $p_i(k<i<k+r+1)$, it is alternatively possible to determine the value of these periods by nterpolation from the values of $p_k$ and $p_{k+r+1}$ For $p_i$ is then found:

$$p_i = \frac{k + r + 1 - i}{r + 1} p_k + \frac{i - k}{r + 1} p_{k+r+1}. \quad (21)$$

In the segmenting means 40 shown in FIG. 4 the input signal is applied to a first buffer circuit 54 and to a second buffer circuit 56. The output of the first buffer circuit 54 is connected to a first window circuit 58, while the output of the second buffer circuit 56 is connected to a second window circuit 60. The output of the first window circuit 58 is connected to a first input of an adder circuit 62 and the output of the second window circuit 60 is connected to a second input of the adder circuit 62. The output of the adder circuit 62 also forms the output of the segmenting means 40.

In the buffer circuits 54 and 56 are stored two successive pitch periods of the quasi-periodic signal. In the buffer circuit 54 is stored a first period of this quasi-periodic signal, while in the buffer circuit 56 is stored a second period of the quasi-periodic signal. This second period of the quasi-periodic signal immediately follows the first period of the quasi-periodic signal. The window circuit 58 multiplies the first period of the quasi-periodic signal by the window function according to (1), while the second window circuit multiplies the second period of the quasi-periodic signal by the window function according to (2). For this purpose, the window circuits 58 and 60 receive information about the periods $p_k$ and $p_{k+1}$. The adder circuit 62 produces the reduced signal segment in that it adds together the output signals of the window circuits 58 and 60. It will be evident that the encoder and decoder according to the inventive idea may be arranged in special hardware, but that it is alternatively possible for the encoder and/or decoder to be arranged as a suitably programmed processor.

Figures 5A, 5B, 5C, 5D:
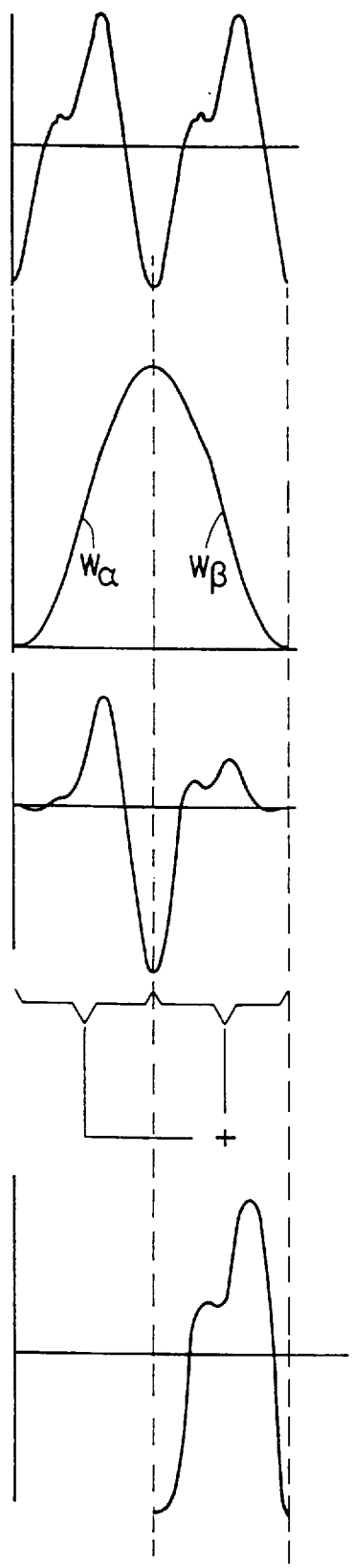
FIGS. 5a–5d show graphs of the signals as they occur in the segmenting means 40 shown in FIG. 4.

FIG. 5*a* shows two successive periods of the quasi-periodic signal plotted against time. According to the inventive idea and for determining the reduced segments, the first period is multiplied by a first window function $w_\alpha$ and the second period is multiplied by the second window function $w_\beta$. Examples of the window functions $w_\alpha$ and $w_\beta$ are shown in FIG. 5*b*. FIG. 5*b* distinctly shows that the window function $w_\alpha$ and $w_\beta$ are each other's continuation. FIG. 5*c* shows the two successive periods of the quasi-periodic signal in which these periods are multiplied by the respective window functions $w_\alpha$ and $w_\beta$. The reduced signal segment is now obtained by shifting the signal period weighted with the window function $w_\alpha$ shown in FIG. 5c over a period of time $p_k$ and adding this signal period to the signal period weighted with the window function $w_\beta$. The reduced signal segment thus obtained is shown in FIG. 5d. Experiments have shown that there is no audible difference between the signal according to FIG. 5d periodically continued for an additional period of time and the original signal shown in FIG. 5a. However, half the transmission capacity necessary for transmitting the signal shown in FIG. 5a will suffice for transmitting the signal shown in FIG. 5d.

Figure 6A:
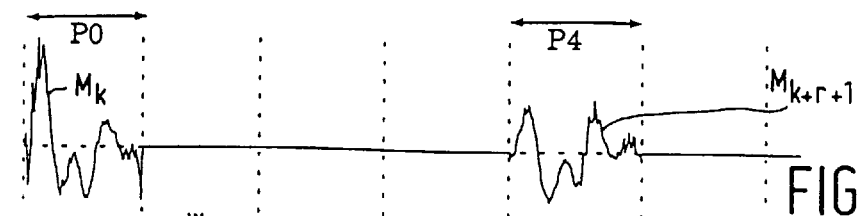
FIGS. 6a–6g show graphs of the signal forms as they may occur in the decoder 28 when the reconstructed signal is derived.
Figure 6B:
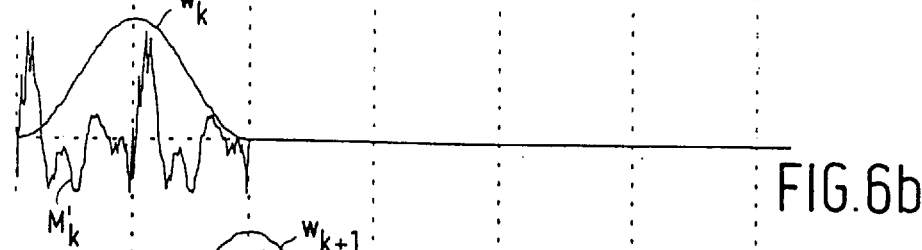
Figure 6C:
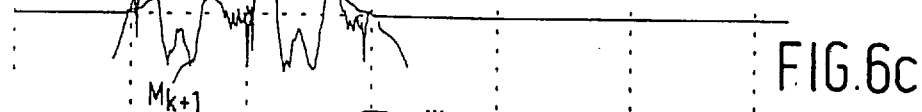
Figure 6D:
Figure 6E:
Figure 6F:
Figure 6G:

FIG. 6a shows two consecutively transmitted reduced signal segments in their correct time relationship. In the situation shown in FIG. 6 the value of r is equal to three. The reduced signal segments shown are then the reduced signal segments $M_k$ and $M_{k+r+1}$.

From the reduced signal segments $M_k$ and $M_{k+r+1}$ are derived signal segments $M_k'$ and $M_{k+r+1}'$ for periodic continuation by a single period. The lacking segments $M_{k+1}'$, $M_{k+2}'$ and $M_{k+3}'$ are derived from the signal segments $M_k'$ and $M_{k+r+1}'$, by implementing (6) and (7). The segments $M_k'$, $M_{k+1}'$, $M_{k+2}'$, $M_{k+3}'$ and $M_{k+r+1}'$ are shown in the exact time relationship in FIGS. 6b, 6c, 6d, 6e and 6f, respectively.

In addition, FIGS. 6b, 6c, 6d, 6e and 6f show the respective window functions $w_k$, $w_{k+1}$, $w_{k+2}$, $w_{k+3}$ and $w_{k+r+1}$ according to formula (9). The middle (transition between two periods) of the signal segment $M_i'$ and the maximum of the corresponding window function $w_i$ are always situated at an instant $n=n_i$. In the FIG. 6g the reconstructed signal is shown which is obtained from the summation of the signal segments $M_i$ weighted with the appropriate window functions $w_i$.

FIG. 7a shows the transmitted signal at a transition from an unvoiced speech signal to a voiced speech signal. In the interval U (unvoiced) it is a matter of unvoiced speech that is to be fully coded. In the interval V (voiced) the voiced (quasi-periodic) speech occurs and it will be sufficient to transmit an incomplete sequence of signal segments and reconstruct according to the inventive idea the lacking signal segments.

To avoid audible distortion occurring in the reconstructed signal at the transition from unvoiced to voiced speech, the first reduced signal segment is extended by a period $P_f$ to a signal segment having a period of $3p_f$ when the reconstructed signal is determined. This signal segment is positioned with time, so that the second period of this extended signal segment coincides with the period of the reduced signal segment as is shown in FIG. 7b. In this signal segment the two occurring segments $2p_f$ in length are weighted with the window function $w'_{f-1}$ according to (10) and $w'_f$ according to (9), which are also shown in FIG. 7b. The instant $n=n_f$ is then assumed to coincide with the beginning of the first period of the voiced speech signal segment. In addition, the unvoiced speech is weighted with a window function equal to (11) at instant n situated between $n_f$ and $n_f-p_f$. This window function is shown in FIG. 7c. The reconstructed signal is then the sum of the weighted voiced and unvoiced speech signal segments. This reconstructed signal is shown in FIG. 7d.

Figure 8A:
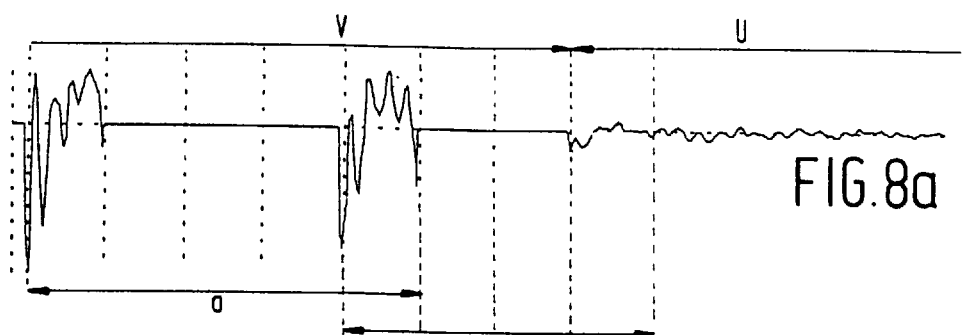
FIGS. 8a–8c show graphs of the signal forms as they may occur in the decoder 28 at the transition from a voiced speech signal to an unvoiced speech signal.

In FIG. 8a the transmitted signal is shown at the transition from a voiced speech signal to an unvoiced speech signal. In the interval V (voiced) it is a matter of voiced speech, while in the interval U (unvoiced) and voiced speech is concerned. Also at the transition from voiced to unvoiced speech shown in FIG. 8a specific measures are to be taken to avoid audible distortion occurring. A possibility is interpolation based on the most recently reduced voiced speech signal segment $p_{u-r-1}$ in length, and a signal segment $p_{u-1}$ in length from the unvoiced speech signal segment that begins at the instant of transition from voiced to unvoiced speech. This interpolation is effected in exactly the same manner as the interpolation described hereinbefore based on two reduced signal segments. It is noted that the value of r at the end of a voiced part of the speech signal may happen to be smaller than the value of r during that voiced part of the speech signal. This can be noticed, for example, from FIG. 8a in which the value of r is equal to 3 for the interval a and equal to 2 for the interval b.

Figure 8B:
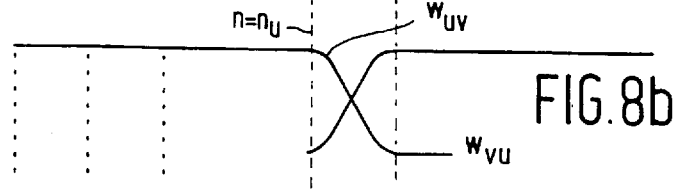
Figure 8C:
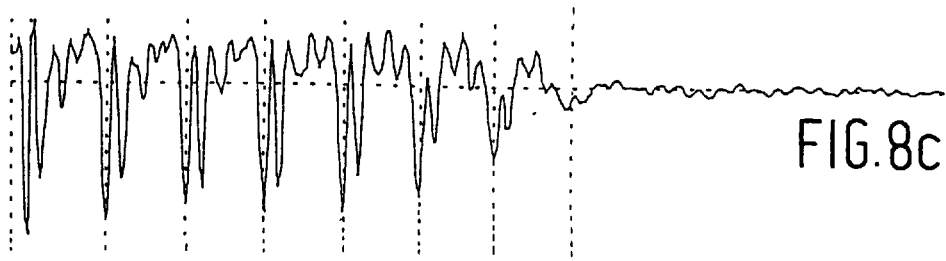

A further measure taken to avoid audible distortion during the transition from voiced to unvoiced speech is weighting with a window function the unvoiced part of the speech signal during a period of time $P_{k+r}$ in length. This window function is equal to 0 at the transition from voiced to unvoiced speech, and equal to 1 a period of time $P_{k+r}$ later. The window function concerned is shown in FIG. 8b. The complete reconstructed signal as shown in FIG. 8c is obtained by adding together the interpolated voiced part of the speech signal and the weighted unvoiced part of the speech signal. It is observed that for carrying out said measures for avoiding undesired side effects, the two-way switch 32 in the receiver 6 shown in FIG. 1 is to be replaced by an element that is capable of performing said operations on the output signals of the decoder 28 and the decoder 30.

FIG. 9 shows the application of the alternative window functions according to (15). FIG. 9a symbolically shows the reduced segments $M_k$ and $M_{k+r+1}$. In FIG. 9b the segments $M'_k$ and $M'_{k+r+1}$ are shown with right above them the window functions $1-w_k$ and $w_{k+r+1}$. FIG. 9c shows the signal segment $M'_{k+1}$ with the appropriate window function formed by the combination of the window functions $w_{k+1}$ and $1-w_{k+2}$. FIG. 9d shows the signal segment $M'_{k+2}$ with the appropriate window function formed by the combination of the window functions $w_{k+2}$ and $1-w_{k+3}$. Finally, FIG. 9e shows the signal segment $M'_{k+r}$ with the appropriate window function formed by the combination of the window functions $w_{k+r}$ and $1-w_{k+r+1}$. These drawing Figures distinctly show that the transitions situated between the various segments coincide with the overlapping of the shortest segments of successive combining segments.

FIG. 10 shows the situation in which successive non-overlapping shortest segments occur. This happens between the segments $M'_{k+1}$ and $M'_{k+2}$. The window function $w_{k+2}$ then becomes equal to zero at the end of the shortest period in the signal segment $M'_{k+1}$. The beginning of the window function $w_{k+2}$ coincides with the beginning of the shortest period of the signal segment $M'_{k+2}$. Between the end of the shortest period in the signal segment $M'_{k+1}$ and the beginning of the shortest period in the signal segment $M'_{k+2}$, the reconstructed signal is equal to zero.

We claim:

1. Transmission system comprising a transmitter which includes an encoder for deriving an encoded signal from a quasi-periodic signal, transmitting means for transmitting the encoded signal to a receiver, which receiver includes a decoder for deriving a reconstructed signal from the encoded signal, characterized in that the encoder comprises segmenting means for deriving signal segments which are each representative of two successive periods of the quasi-periodic input signal, said signal segments having a duration which is dependent on a fundamental frequency of the quasi-periodic input signal, in that the encoded signal is representative of an incomplete sequence of signal segments, and in that the decoder is arranged for deriving a reconstructed signal from a combination of window-function-weighted successive signal segments from a sequence of signal segments that has been complemented by interpolation.

2. Transmission system as claimed in claim 1, characterized in that the segmenting means comprise window means for determining reduced signal segments from a sum formed by a first period of the quasi-periodic signal weighted with a first coding window function and a second period of the quasi-periodic signal weighted with a second coding window function, and in that the signal segments comprise reduced signal segments.

3. Transmission system as claimed in claim 2, characterized in that the initial value of the first coding window function and the final value of the second coding window function are equal to zero and in that the final value of the first coding window function is equal to the initial value of the second coding window function.

4. Transmitter comprising an encoder for deriving an encoded signal from a quasi-periodic input signal, transmitting means for transmitting the encoded signal by a channel, characterized in that the encoder comprises segmenting means for deriving signal segments which are each representative of two successive periods of the quasi-periodic input signal, said signal segments having a duration which is dependent on a fundamental frequency of the quasi-periodic input signal, and in that the encoded signal is representative of an incomplete sequence of signal segments.

5. Receiver comprising a decoder for deriving a reconstructed signal from an encoded signal derived from a quasi-periodic input-signal, characterized in that the decoder is arranged for deriving a reconstructed signal from a combination of window-function-weighted successive signal segments from a sequence of signal segments complemented by interpolation, said signal segments having a duration which is dependent on a fundamental frequency of the quasi-periodic input signal.

6. Encoder for deriving an encoded signal from a quasi-periodic signal, characterized in that the encoder comprises segmenting means for deriving signal segments which are each representative of two successive periods of the quasi-periodic input signal, said signal segments having a duration which is dependent on a fundamental frequency of the quasi-periodic input signal, and in that the encoded signal is representative of an incomplete sequence of signal segments.

7. Decoder for deriving a reconstructed signal from an encoded signal derived from a quasi-periodic input-signal, characterized in that the decoder is arranged for deriving a reconstructed signal from a combination of window-function-weighted successive signal segments from a sequence of signal segments complemented by interpolation said signal segments having a duration which is dependent on a fundamental frequency of the quasi-periodic input signal.

8. Codec comprising an encoder for deriving an encoded signal from a quasi-periodic signal and a decoder for deriving a reconstructed signal from an encoded input signal, characterized in that the encoder comprises segmenting means for deriving signal segments which are each representative of two successive periods of the quasi-periodic input signal, said signal segments having a duration which is dependent on a fundamental frequency of the quasi-periodic input signal, in that the first encoded signal is representative of an incomplete sequence of signal segments and in that the decoder is arranged for deriving a reconstructed signal from a combination of window-function-weighted successive signal segments from a sequence complemented by interpolation of the incomplete signal segment sequence represented by the encoded signal.

* * * * *